United States Patent Office 3,126,409
Patented Mar. 24, 1964

3,126,409
P-t-OCTYLPHENYL β-RESORCYLATE
Frank J. Arthen, South Bound Brook, N.J., assignor to American Cyanamid Company, New York, N.Y., a corporation of Maine
No Drawing. Filed Oct. 25, 1961, Ser. No. 147,470
1 Claim. (Cl. 260—473)

This invention generally relates to, and has for its object the provision of a class of new and useful chemical compounds.

More particularly, this invention relates to compounds of the Formula I:

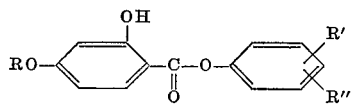

wherein R is either hydrogen or alkyl of from one to eighteen carbons; R' is either alkyl having four to eighteen carbons, alkoxy having one to eighteen carbons or halogen (e.g., chlorine and bromine); and R'' is either hydrogen, alkyl or alkoxy of no more than eighteen carbons or halogen (e.g., chlorine or bromine).

The compounds of Formula I wherein R is hydrogen are conveniently prepared by sequential esterification and alkylation in any order. This esterification of β-resorcyclic acid with a phenolic derivative of the Formula II:

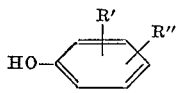

wherein R' and R'' are as hereinbefore defined yields an intermediate aryl β-resorcylate. The esterification may be conducted in the presence of a condensation reagent such as phosphorous oxychloride or polyphosphoric acid.

Suitable phenols for this purpose are inter alia:

| | |
|---|---|
| p-Octylphenol | p-n-Butylphenol |
| m-Amylphenol | p-Cyclohexylphenol |
| p-Nonylphenol | o-Cyclohexylphenol |
| p-Dodecylphenol | o-Cyclopentylphenol |
| p-Isoamylphenol | p-Cyclopentylphenol |
| o-Isoamylphenol | 2-t-butyl-4-methylphenol |
| p-Sec-butylphenol | p-tert.-butylphenol |
| o-Sec-butylphenol | p-Chlorophenol |
| p-Tert.-amylphenol | 2,4-dichlorophenol |
| o-Sec-amylphenol | p-Bromophenol |
| o-t-Butylphenol | 3,4-dichlorophenol |
| o-Chlorophenol | 3-methoxyphenol |
| 4-methoxyphenol | 3,4-dimethoxyphenol |
| o-n-Butylphenol | |

The compounds thus prepared may be alkylated to yield the compounds of Formula I wherein R is alkyl as above described. The alkylation is conveniently conducted in a solvent medium with an alkyl halide in the presence of an acid acceptor such as potassium carbonate, pyridine or triethanolamine. Suitable alkylating agents are alkyl iodides and bromides of from one to eighteen carbon atoms such as methyl iodide, ethyl iodide, butyl bromide, hexyl iodide, dodecyl bromide and octadecyl bromide including both straight and branched chain derivatives.

The compounds of Formula I are useful as intermediates for chemical reactions, as sunburn preventatives and as additives for the stabilization of polymeric materials, e.g. polyolefins such as polyethylene and polypropylene.

This invention may be further illustrated by the following examples in which parts are by weight unless otherwise stated.

Example 1

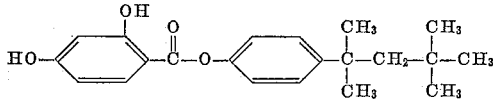

β-Resorcylic acid (15.4 parts), p-(t-octyl)-phenol (20.6 parts) and phosphorous oxychloride (30.6 parts) are stirred and heated at 125° C. for 30 minutes. The mixture is cooled and drowned in water and a solid forms. The solid is recrystallized from methylcyclohexane. Melting point 166–167° C.

When either dodecylphenol (26.2 parts) or nonylphenol (22.0) parts is used in place of the p-t-octylphenol in the above example, the corresponding dodecylphenyl β-resorcylate or nonylphenyl β-resorcylate is respectively obtained.

Example 2

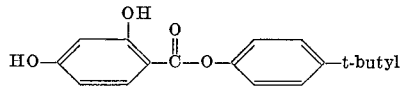

154 parts of β-resorcylic acid and 150 parts of p-tert-butylphenol are blended together and added portionwise to 300 parts of polyphosphoric acid preheated on a steam bath. After heating for 30 minutes the paste is cooled in an ice-water bath and drowned in 1,000 parts of water. The mixture is heated for one hour on a steam bath and cooled. The product is recrystallized from toluene giving crystals (M.P. 158–158.5° C.).

When 176 parts of p-cyclohexylphenol or 112 parts of p-chlorophenol is used in place of the p-tert-butylphenol in the above example, the corresponding p-cyclohexylphenyl β-resorcylate or p-chlorophenyl β-resorcylate is obtained.

Example 3

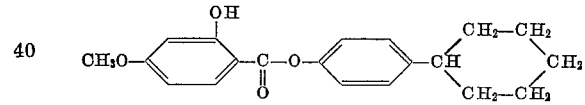

p-Cyclohexylphenyl β-resorcylate (312 parts) methyl iodide (142 parts), and anhydrous potassium carbonate (158 parts) in 1000 parts of acetone are refluxed for 10 hours. The mixture is drowned in water and the product collected by filtration and recrystallized from ethanol.

Example 4

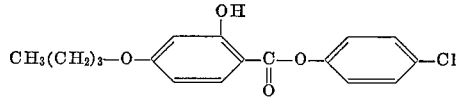

p-Chlorophenyl β-resorcylate (200 parts), n-butyl bromide (137 parts), potassium carbonate (158 parts), potassium iodide (2 parts) and acetone 1000 parts are refluxed 10 hours. The mixture is drowned with water, and the product filtered and recrystallized.

Example 5

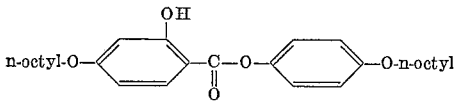

4-O-n-octyl-β-resorcylic acid (266 parts), 4-n-octyloxyphenol (222 parts) and phosphorous oxychloride (306 parts) are heated at 135° C. for 30 minutes. The mixture is drowned in water, and the resulting product is recrystallized.

Example 6

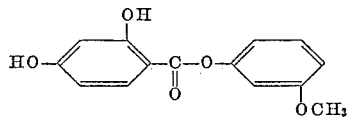

β-Resorcylic acid (154 parts), m-hydroxy anisole (123 parts) and phosphorous oxychloride (306 parts) are stirred and heated at 125° C. for 30 minutes. The mixture is cooled and drowned in water. The product is recrystallized.

I claim:
The compound p-t-octylphenyl β-resorcylate.

References Cited in the file of this patent
UNITED STATES PATENTS

| | | |
|---|---|---|
| 2,126,179 | Duggan | Aug. 9, 1938 |
| 2,464,250 | Moll et al. | Mar. 15, 1949 |
| 2,858,293 | Clark et al. | Oct. 28, 1958 |

OTHER REFERENCES

Hirwe et al.: Chem. Abstracts, volume 49, pages 10887, 14684 (1955).